United States Patent [19]

Ichihashi

[11] Patent Number: 4,744,389
[45] Date of Patent: May 17, 1988

[54] PRESSURE CONTROL DEVICE

[75] Inventor: Kouji Ichihashi, Higashimatsuyama, Japan

[73] Assignee: Diesel Kiki Co., Ltd., Tokyo, Japan

[21] Appl. No.: 918,210

[22] Filed: Oct. 14, 1986

[30] Foreign Application Priority Data

Oct. 15, 1985 [JP] Japan .................. 60-227735

[51] Int. Cl.$^4$ ............................. F15B 13/044
[52] U.S. Cl. ................. 137/625.65; 251/129.15
[58] Field of Search .......... 137/625.65; 251/129.15

[56] References Cited

U.S. PATENT DOCUMENTS

| 4,074,700 | 2/1978 | Engle | 137/625.65 X |
| 4,250,922 | 2/1981 | Will et al. | 137/625.65 |
| 4,535,816 | 8/1985 | Feder et al. | 137/625.65 |
| 4,579,145 | 4/1986 | Leiber et al. | 137/625.65 |
| 4,635,683 | 1/1987 | Nielsen | 137/625.65 |
| 4,655,254 | 4/1987 | Hafner et al. | 137/625.65 |

FOREIGN PATENT DOCUMENTS

| 3402119 | 7/1985 | Fed. Rep. of Germany | 137/625.65 |
| 52510 | 4/1985 | Japan . | |
| 52509 | 4/1985 | Japan . | |
| 2117872 | 10/1983 | United Kingdom | 137/625.65 |
| 2122728 | 1/1984 | United Kingdom | 137/625.65 |
| 1024884 | 6/1983 | U.S.S.R. | 251/129.15 |

Primary Examiner—Gerald A. Michalsky
Attorney, Agent, or Firm—John E. Toupal; Harold G. Jarcho

[57] ABSTRACT

A hydraulic pressure controller including a valve body having a longitudinal bore and defining an inlet port for connection to a hydraulic pump, an outlet port for connection to a hydraulically operated device, a discharge port for connection to a hydraulic fluid reservoir and a cylindrical end portion surrounding a portion of the longitudinal bore, with the ports opening transversely into the longitudinal bore. Also included is a valve spindle axially movable in the longitudinal bore between positions that provide flow passages between the inlet, outlet and discharge ports; an electromagnet having a solenoid winding, a fixed magnetic core, and a cylindrical plunger movable within the winding and axially aligned and engageable end-to-end with the valve spindle; and a cylindrical guide tube having an open ended length portion fitted over the cylindrical end portion and another length portion slidably fitted over the plunger.

14 Claims, 1 Drawing Sheet

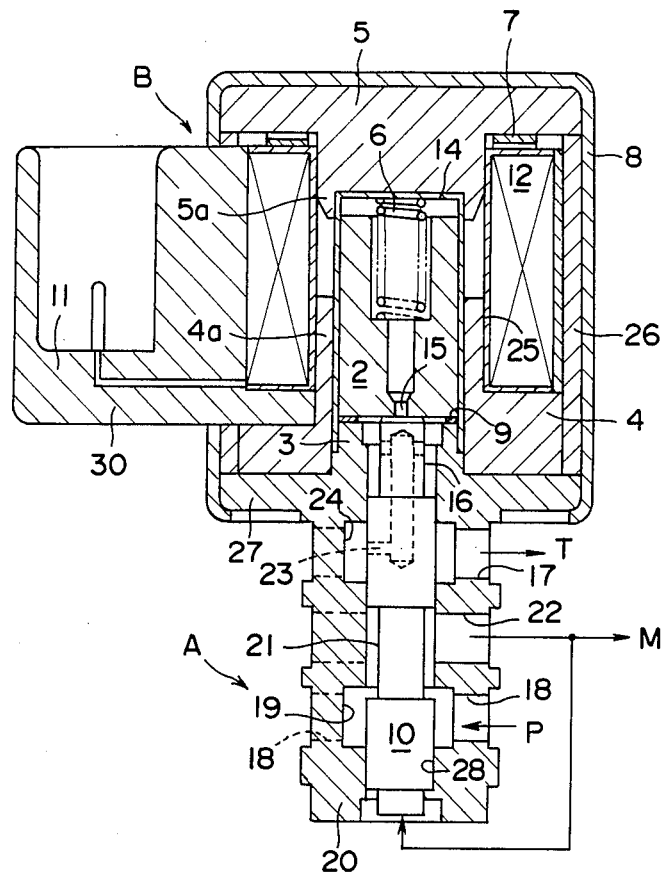

PRESSURE CONTROL DEVICE

BACKGROUND OF THE INVENTION

The present invention relates generally to a pressure controller and, more particularly, to an electromagnetically operated pressure controller.

Conventional pressure controllers are disclosed in Laid-Open Japanese Utility Model Applications Nos. 52509/1985 and 52510/1985. Those applications relate to structures for providing concentricity between an electromagnetic coil and a plunger. As disclosed, a shaft on a plunger is supported by bearings on a core of an electromagnetic coil. However, this prior art structure entails a complex and expensive construction. Specifically, the machining precision required of the bearing portion significantly increases the cost of the device.

The object of the present invention, therefore, is to provide an improved pressure controller that is simple in construction and in which an electromagnetic plunger and a valve spindle driven thereby may be assembled on a solenoid with high accuracy and concentricity.

SUMMARY OF THE INVENTION

The invention is a hydraulic pressure controller including a valve body having a longitudinal bore and defining an inlet port for connection to a hydraulic pump, an outlet port for connection to a hydraulically operated device, a discharge port for connection to a hydraulic fluid reservoir and a cylindrical end portion surrounding a portion of the longitudinal bore, with the ports opening transversely into the longitudinal bore. Also included is a valve spindle axially movable in the longitudinal bore between positions that provide flow passages between the inlet, outlet and discharge ports; an electromagnet having a solenoid winding, a fixed magnetic core, and a cylindrical plunger movable within the winding and axially aligned and engageable end-to-end with the valve spindle; and a cylindrical guide tube having an open ended length portion fitted over the cylindrical end portion and another length portion slidably fitted over the plunger. This single arrangement provides desired concentricity between the solenoid winding, the plunger and the valve spindle.

According to specific features, the invention includes a bias spring urging the plunger toward the valve spindle, the guide tube is formed of a non-magnetic material and the valve body further defines an end chamber partially defined by an end of the valve spindle opposite to the plunger and adapted to communicate with the outlet port. This arrangement establishes a desired relationship between fluid pressure at the outlet port and the magnitude of current conducted by the solenoid winding.

According to other features, the controller includes an annular non-magnetic spacer disposed between the plunger and the cylindrical end portion; the valve spindle comprises a pair of cylindrical land portions slidably fitted into the longitudinal bore and separated by a reduced diameter annular groove; and the longitudinal bore defines one circumferential groove intersecting the inlet port and another circumferential groove intersecting the discharge port. This simple construction establishes the desired flow passages between the inlet, outlet and discharge ports.

According to yet another feature of the invention, the another length portion of the guide tube is closed; and the controller includes vent passages providing communication between the cavity defined by the another length portion and the discharge port. The vent passages prevent undesirable operation that would result from excessive pressure or vacuum within the guide tube.

DESCRIPTION OF THE DRAWINGS

These and other objects and features of the invention will become more apparent upon a perusal of the following description taken in conjunction with the accompanying drawing which is a schematic cross-sectional view in plan of a pressure controller according to the present invention.

DESCRIPTION OF THE PREFERRED EMBODIMENT

As shown in the drawing, a pressure controller according to the present invention includes a pressure control valve A and an electromagnetic actuator B coupled thereto. The pressure control valve A has a valve spindle 10 slidably fitted in a longitudinal bore 28 extending through a valve housing 20. Formed on one end of the valve housing 20 is a transverse flange 27 and a cylindrical end portion 3 concentric with the longitudinal bore 28.

Opening transversely into the longitudinal bore 28 are an inlet port 18, an outlet port 22 and a discharge port 17. The discharge port 17 is connected to a reservoir tank T, the inlet port 18 is connected to a discharge opening of a hydraulic pump P, and pressurized oil at the outlet port 22 is supplied to a hydraulically operated device M and a chamber in the valve housing 20 partially defined by an end of the valve spindle 10 opposite to the electromagnetic actuator B. Formed in the longitudinal bore 28 are circumferential grooves 19, 24 disposed on opposite sides of the outlet port 22 and intersecting, respectively, the inlet port 18 and the discharge port 17.

The valve spindle 10 has an annular groove 21 straddled by cylindrical land portions that are slidably fitted in the longitudinal bore 28. In addition a reduced diameter end 16 of the spindle 10 is spaced from the inner surface of the longitudinal bore 28. The annular groove 21 provides fluid communication between the circumferential groove 19 and the outlet port 22 in a neutral position of the spindle 10. In addition, an internal vent passage 23 in the spindle 10 provides fluid communication between the discharge port 17 and the annular chamber surrounding the reduced diameter portion 16.

The electromagnetic actuator B is provided with a solenoid coil 12 and an internal plunger 2 disposed concentrically therewith. A cup-shaped guide tube 14 is slidably fitted over the plunger 2 and is formed from a non-magnetic metallic material, The cylindrical end portion 3 of the valve housing 20 is fitted into an open end of the guide tube 14. Retained between a closed end wall of the guide tube 14 and a central cavity in the plunger 2 is a spring 6. A vent passage provided with a buffer orifice 15 extends through the plunger 2. Interposed between the plunger 2 and the cylindrical end portion 3 is an annular plate 9 formed of a non-magnetic material.

Fitted over a lower section of the guide tube 14 is a sleeve 4a with an integral magnetic core 4 while a sleeve 5a with an integral magnetic core 5 is fitted over an upper portion of the guide tube 14. A spool 25 retaining a solenoid coil 12 is fitted over the sleeves 5a and 4a and the spool 25 is supported on a frame 30 having a connector portion 11 projecting outwardly of a slit in a cap 8. The core 4 is urged against the flange 27 and the core 5 is urged against the cap 8 by a spring washer 7. A magnetic sleeve 26 is disposed between the outer periphery of the core 4 and the cup-shaped cap 8 which also covers the core 5 and has an open end rolled over the flange 27.

OPERATION

With the solenoid coil 12 deenergized, the spring 6 forces the engaged plunger 2 and spindle 10 downwardly as shown in the drawing. In that position, the inlet port 18 communicates with the outlet port 22 to provide pressurized hydraulic fluid to the hydraulically operated device M. In addition, the hydraulic pressure at the outlet port 22 is fed back to the lower end of the spindle 10 which assumes a rest position balancing the output hydraulic pressure and the force applied by the spring 6.

With the coil 12 energized, the plunger 2 is attracted upwardly against the spring 6 and is followed by the spindle 10 under the influence of the output hydraulic pressure acting on its lower end. Accordingly, a land portion of the spindle 10 is drawn by the annular groove 19 and the hydraulic pressure fed through the annular groove 21 and the outlet port 22 to the device M and the bottom of the spindle 10 is reduced. Consequently, the spindle 10 assumes a new position wherein the resultant upward forces of the output hydraulic pressure on the spindle 10 and the electromagnetic force on the plunger 2 are balanced by the downward force applied by the spring 6. Thus, an increase in electric current applied to the coil 12 decreases the hydraulic pressure at the output port 22 in an inverse proportional fashion. Conversely, a decrease in the current applied to the coil 12 increases the hydraulic pressure at the outlet port 22 in an inverse proportional fashion.

By controlling the current applied to the coil 12, hydraulic pressure of a predetermined level at the inlet port 18 can be variably controlled at the outlet port 22. The device M, therefore, is continuously controlled by the current applied to the coil 2. During this controlling movement of the spindle 10 and the plunger 2, the vent passages 15 and 23 prevent the creation of excessive pressure or vacuum in the guide tube 14 above the plunger 2.

Obviously, many modifications and variations of the present invention are possible in light of the above teachings. It is to be understood, therefore, that the invention can be practiced otherwise than as specifically described.

What is claimed:

1. A hydraulic pressure controller comprising:
   a valve body having a longitudinal bore and defining an inlet port for connection to a hydraulic pump, an outlet port for connection to a hydraulically operated device, a discharge port for connection to a hydraulic fluid reservoir and a cylindrical end portion surrounding a portion of said longitudinal bore and concentric therewith, said ports opening transversely into said longitudinal bore;
   a valve spindle axially movable in said longitudinal bore between positions that provide flow passages between said inlet, outlet and discharge ports;
   an electromagnet having a solenoid winding, a fixed magnetic core defining an alignment cylinder, and a cylindrical plunger movable within said winding and axially aligned and engageable end-to-end with said valve spindle; and
   a cylindrical guide tube having a first open ended inner length portion fitted over said cylindrical end portion, another inner length portion slidably fitted over said plunger, and an outer length portion fitted within said alignment cylinder.

2. A controller according to claim 1 wherein said guide tube is formed of a non-magnetic material.

3. A controller according to claim 2 including a bias spring urging said plunger toward said valve spindle, and wherein said valve body further defines an end chamber partially defined by an end of said valve spindle opposite to said plunger and adapted to communicate with said outlet port.

4. A controller according to claim 3 including an annular non-magnetic spacer disposed between said plunger and said cylindrical end portion.

5. A controller according to claim 4 wherein said valve spindle defines a pair of cylindrical land portions slidably fitted into said longitudinal bore and separated by a reduced diameter annular groove.

6. A controller according to claim 5 wherein said longitudinal bore defines one circumferential groove intersecting said inlet port and another circumferential groove intersecting said discharge port.

7. A controller according to claim 1 wherein said another length portion of said guide tube is closed, and including vent means providing communication between the interior of said another length portion and said discharge port.

8. A controller according to claim 7 wherein said vent means comprises passages in said plunger and said valve spindle.

9. A controller according to claim 8 wherein said guide tube is formed of a non-magnetic material.

10. A controller according to claim 9 including a bias spring urging said plunger toward said valve spindle, and wherein said valve body further defines an end chamber partially defined by an end of said valve spindle opposite to said plunger and adapted to communicate with said outlet port.

11. A controller according to claim 10 including an annular non-magnetic spacer disposed between said plunger and said cylindrical end portion.

12. A controller according to claim 11 wherein said valve spindle a pair of cylindrical land portions slidably fitted into said longitudinal bore and separated by a reduced diameter length section.

13. A controller according to claim 12 wherein said longitudinal bore defines one circumferential groove intersecting said inlet port and another circumferential groove intersecting said discharge port.

14. A controller according to claim 1 including an annular non-magnetic spacer disposed between said plunger and said cylindrical end portion.

* * * * *